United States Patent [19]

Longsworth

[11] Patent Number: 4,593,530
[45] Date of Patent: Jun. 10, 1986

[54] METHOD AND APPARATUS FOR IMPROVING THE SENSITIVITY OF A LEAK DETECTOR UTILIZING A CRYOPUMP

[75] Inventor: Ralph C. Longsworth, Allentown, Pa.

[73] Assignee: Air Products and Chemicals, Inc., Allentown, Pa.

[21] Appl. No.: 598,622

[22] Filed: Apr. 10, 1984

[51] Int. Cl.⁴ .............................................. B01D 8/00
[52] U.S. Cl. ........................................ 62/55.5; 55/269; 62/100; 62/268; 73/863.11; 417/901
[58] Field of Search .................. 62/45, 55.5, 100, 268; 417/901; 55/269; 73/863.11, 863.12

[56] References Cited

U.S. PATENT DOCUMENTS

| | | | |
|---|---|---|---|
| 3,137,551 | 6/1964 | Mark | 62/55.5 |
| 3,262,279 | 7/1966 | Moore, Jr. | 62/55.5 |
| 3,395,548 | 8/1968 | Yearwood | 62/45 |
| 3,425,233 | 2/1969 | Brose | 62/55.5 |
| 3,536,418 | 10/1970 | Breaux | 62/55.5 |
| 3,620,029 | 11/1971 | Longsworth | 62/6 |
| 3,721,101 | 3/1973 | Sheppard et al. | 62/55.5 |
| 4,023,398 | 5/1977 | French et al. | 62/55.5 |
| 4,150,549 | 4/1979 | Longsworth | 62/55.5 |
| 4,425,811 | 1/1984 | Chatzipetros et al. | 73/863.11 |

Primary Examiner—Ronald C. Capossela
Attorney, Agent, or Firm—James C. Simmons; E. Eugene Innis

[57] ABSTRACT

A cryopump and method for using cryopumping to enhance the sensitivity of a leak detection system. The cryopump is used to control the relative pumping speeds of the gases normally frozen out on the pump or adsorbed in a cold adsorbent to thereby achieve the enhanced sensitivity of the system. The system is characterized by controlled access to the cold panel which is disposed within the warm panel.

20 Claims, 5 Drawing Figures

4,593,530

METHOD AND APPARATUS FOR IMPROVING THE SENSITIVITY OF A LEAK DETECTOR UTILIZING A CRYOPUMP

TECHNICAL FIELD

This invention relates to leak detectors of the type which use a tracer gas, usually helium, to test the integrity of a sealed vessel housing or the like. Standard leak detectors utilize a mass spectrometer which is coupled to a mechanical vacuum pump and a diffusion pump with a liquid nitrogen cold trap to freeze out certain gases prior to the atmosphere to be tested reaching the mass spectrometer. The particular invention relates to utilizing a cryopump apparatus in place of the cold trap and diffusion pump in a standard leak detector.

BACKGROUND OF THE PRIOR ART

The prior art of leak detection is adequately described in the 1976 publication *Handbook of Vacuum Leak Detection* published by the American Vacuum Society. Conventionally when leak detecting a vessel it is most common to connect the input port of the leak detector to the vessel under test and evacuate it to a low pressure using a mechanical pump. Further pressure reduction is achieved by use of a diffusion pump in combination with a liquid nitrogen cooled cold trap which freezes out water vapor, carbon dioxide and hydrocarbons including oil from the diffusion pump so they do not contaminate the mass spectrometer leak detector device. The mass spectrometer leak detector has means for ionizing the detecting gas, which is usually helium, accelerating it in a well defined beam, bending the beam by means of a magnet and/or a direct current and/or an alternating current electrostatic field which spreads out the beam proportional to molecular mass, and detecting the ion beam for the tracer gas.

To find a leak in the vessel which is being tested, one sprays a small stream of tracer gas over the outside of the vessel. Tracer gas drawn into the vessel diffuses rapidly to the leak detector where it causes an increase in the output signal. The partial pressure of the tracer gas at the leak detector is a balance between the rate at which the tracer gas is leaking into the system and the rate at which the diffusion pump removes it.

Another method of leak detecting is to fill the vessel with tracer gas and probe the outside with a sniffer connected to the input of the leak detector. The leak detector vacuum pump system is used to draw a small stream of air from the sniffer probe to the mass spectrometer leak detector device. Tracer gas scaping through a leak in the vessel is thus detected by the leak detector. This technique requires a low background of tracer gas in the environment in order for the tracer gas from the leak to be detected.

Conventional mass spectrometer leak detectors employ a diffusion pump and a liquid nitrogen cold trap to remove certain gases from the testing atmosphere so that the instrument can sense the presence of helium at very low levels. In other prior art devices cryopumps have been used to create ultra-low vacuums. The art of cryopumping (cryogenic pumping) is adequately set out in the specification of U.S. Pat. No. 4,150,549, the specification of which is incorporated herein by reference. In the '549 patent, it is pointed out that cryopumping devices have used three surfaces to remove different gases from the vacuum environment. These surfaces generally have been cooled to various temperatures below 120° K. (Kelvin). These surfaces have been used to remove water and carbon dioxide (by freezing in a temperature range of 40°–120° K.) nitrogen, oxygen, argon, carbon monoxide, methane, and halogenated hydrocarbons (by freezing at temperatures between 10° K. and 25° K.) and helium, hydrogen, and neon (by cryosorption at temperatures of 10° to 2° K.). Cryosorption is adsorbing gases in a sorbent at cryogenic temperatures as shown in the apparatus of the '549 patent.

SUMMARY OF THE INVENTION

In order to enhance the sensitivity of a mass spectrometer leak detector (MSLD), it has been discovered that a specially designed cryopump can be used to replace the cold trap and diffusion pump normally used with such a device. The cryopump is designed such that the cold panel which normally cryopumps nitrogen, oxygen, argon, carbon monoxide, methane and halogenated hydrocarbons and/or the adsorbent surface which traps helium, hydrogen and neon are separated from the warm panel which cryopumps water vapor oxygen, access to the cryosorbant being controlled by means of a valve or orifice of predetermined size. Controlling access to the cryosorbant coated surface permits establishment of controls of the relative pumping speeds for the various groups of gases which, in turn, enhances the sensitivity of the leak detector.

DESCRIPTION OF THE PREFERRED EMBODIMENTS

Figure 1:
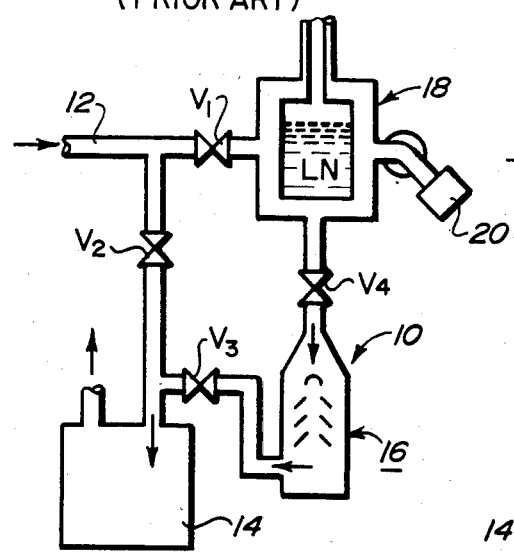
FIG. 1 is a schematic representation of a standard helium mass spectrometer leak detector.

Referring to the drawing and, in particular, FIG. 1, the standard mass spectrometer leak detector system utilizing helium is shown schematically as 10. A vessel filled with helium as a tracer gas is connected to the inlet 12 of the system, the system then being evacuated to a pressure of less than 0.1 Torr using a mechanical pump 14. During the initial evacuation stage, valve V1 is closed, valve V2 is open and valve V3 is closed. After the initial evacuation takes place, valve V1 is opened, valve V2 is closed and valve V3 is opened, and the diffusion pump is used to reduce the pressure in the system to less than $1 \times 10^{-5}$ Torr. Liquid nitrogen cold trap 18 is used to freeze out any water vapor, carbon dioxide, hydrocarbons and the like, including oil from the diffusion pump, so that there is no contamination of the sensitive mass spectrometer 20. The mass spectrometer 20 has means for ionizing the gaseous atmosphere emanating from the vessel being tested and which has passed through the liquid nitrogen cold trap, accelerating the gas into a well-defined beam, bending the beam by means of a magnet or an electrostatic field, thus spreading out the beam proportional to its molecular mass and detecting the ion beam for the tracer gas. The useful output signal from the mass spectrometer is thus proportional to the partial pressure of the tracer gas in the gas at the point where it is ionized. This signal can be amplified by means of an electronic multiplier device or other electronic amplification devices.

The vessel undergoing test is filled with the tracer gas. The outside of the vessel is probed with the sniffer which in turn is connected to the input 12 of the mass spectrometer leak detector system 10 as shown in FIG. 1. The leak detector system 10 by means of the vacuum pumping is used to draw a small stream of air from the sniffer probe to the mass spectrometer. Tracer gas escaping through a leak in the vessel is thus detected by the mass spectrometer.

Another method of testing for leaks is to connect the vessel under test directly to the input 12 of the system 10. A small stream of tracer gas is then sprayed over the outside of the vessel.

Figure 2:
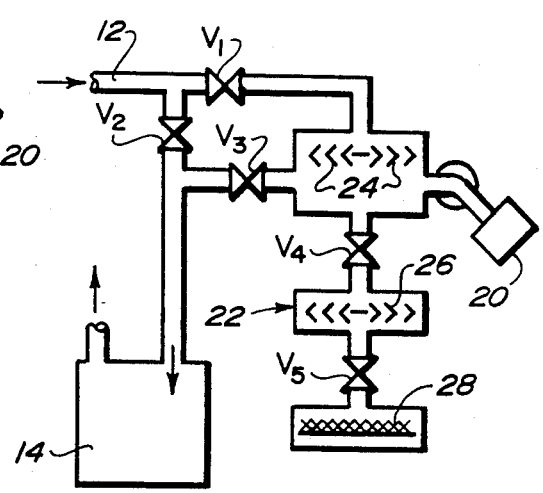
FIG. 2 is a schematic diagram of the system of FIG. 1 utilizing the method and apparatus of the present invention.

Referring to FIG. 2, there is shown a schematic representation of a system utilizing a cryopump in the mass spectrometer leak detector system of FIG. 1. In order to cool down the cryopump shown generally as 22 in FIG. 22 and detailed in FIG. 3, it is necessary to evacuate the cryopump 22 to a pressure of less than 0.5 Torr using the mechanical pump 14 as shown in FIG. 1. During the mechanical pumping operation valves V1 and V2 are closed and valves V3, V4, and V5 are open. Once the cryopump has started to cool down, valve V3 is closed and kept closed during the entire period the cryopump is in operation, typically a week or more. In order to check for a leak in a vessel, either the vessel or the sniffer probe is connected to the input 12 and the mechanical pump 14 is used to reduce the pressure to less than 1 Torr with valve V2 open and valve V1 closed. When this pressure is reached valve V2 is closed and valve V1 is open. The cryopump 22 then reduces the pressure to below $1 \times 10^{-3}$ Torr and preferably below $1 \times 10^{-5}$ Torr before testing begins.

At pressures below about $1 \times 10^{-3}$ Torr, gases are in the free molecular flow regime. This means that as the gas molecules travel about with velocity proportional to their thermal energy they seldom collide with other gas molecules between collisions with the wall. This relationship is set forth in the equation:

$$v = 3kT/M$$

wherein:
v = velocity
K = Planck's constant
T = absolute temperature
M = molecular weight of the gas The gas molecules thus travel into the cryopump as they do in a diffusion pump by virtue of their thermal energy.

Cryopumps remove gases from an atmosphere by virtue of maintaining several surfaces at different temperatures. The surface temperature relationship is used to define a group of gases that will normally be pumped or removed by the particular surface. It is conventional to refer to water vapor, carbon dioxide, and like gases as Group I gases; nitrogen, oxygen, argon, carbon monoxide, methane and halogenated hydrocarbons as Group II gases; and helium, hydrogen and neon as Group III gases.

Inside the cryopump 22 a first or warm panel 24 maintained at a temperature of between 40° and 80° K. will freeze out Group I gases. This is analogous to the liquid nitrogen cold trap in a standard leak detector. A second surface or cold panel 26, maintained at a temperature of between 10° and 15° K., will normally freeze out Group II gases. A third surface or cold adsorbent coated (finely divided charcoal) panel 28 will adsorb Group III gases. The third surface may be a portion of the cold panel as will hereinafter be more fully disclosed.

The tracer gas most commonly used in leak detecting is helium. Helium along with hydrogen and neon is adsorbed in the charcoal adsorbent which is bonded to cold panel 28 of the cryopump 22. Hydrogen and isotopes of hydrogen and helium, namely deuterium and $He^3$ are sometimes used as tracer gases. These gases are also adsorbed on the charcoal. For the remainder of the specification helium will be used to represent all Group III gases while air will be used to represent all of the Group II gases. Water is used to represent Group I gases, such as carbon dioxide, ammonia, sulfur dioxide, and the like. Since gases in Group II are sometimes used as tracer gases, the term tracer gas will mean either gases of Group II or III.

Figure 3:
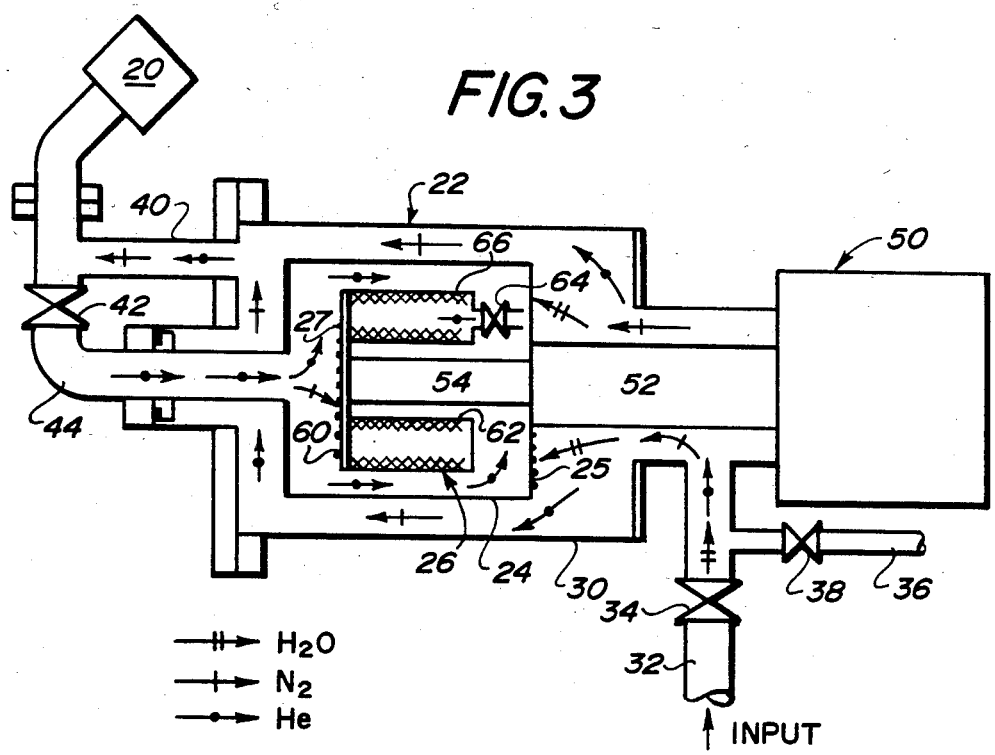
FIG. 3 is a schematic representation of a cryopump according to the present invention.

The cryopump 22 as shown in FIG. 3 includes a housing 30 having an inlet port 32 with an inlet control valve 34, diffusion pump inlet 36 and diffusion pump valve 38. Housing 30 includes an outlet conduit 40 which in turn is connected to the mass spectrometer 20. Mass spectrometer valve 42 is interposed between the mass spectrometer 20 and a return conduit 44 which in turn is connected to the warm panel 24 which is in the form of a cylinder or other convenient shape to completely enclose the cold panel 26. Warm panel 24 is in turn thermally connected to the first or warm stage 52 of a cryogenic refrigerator 50 such as a model DE202 manufactured and sold by Air Products and Chemicals, Inc. of Allentown, Pa. The cryogenic refrigerator 50 is shown and described in U.S. Pat. No. 3,620,029, the specification of which is incorporated herein by reference. Refrigerator 50 is coupled to housing 30 by means of any conventional gas tight apparatus.

Cold panel 26 includes a base plate 60 and an annular structure 62 which can be in the form of a torroid or other convenient closed shape which in turn is accessible through a valve or orifice 64. The inner surfaces of the torroidal portion 62 of cold panel 26 are coated with an adsorbent 66 such as a charcoal. Cold panel 26 is in turn connected to the second or cold stage of the refrigerator 50. Refrigerator 50 normally produces refrigeration at a temperature of about 40° K. at the lower end of warm stage 52 and 12° K. at the lower end of cold stage 54.

The cryopump of FIG. 3 is constructed with the warm cryopanel 24 completely surrounding the cold cryopanel 26 and with the entry port at what would be considered the back 25 of warm panel 24. Gas entering the inlet port 32 flowing through valve 34 would flow around the warm panel 24, thus freezing out Group I gases on this panel as shown schematically by the arrows in the drawing. The gases not trapped by the warm panel would then flow through conduit 40 to the mass spectrometer and through the mass spectrometer valve 42. Valve 42 is of the throttle type but can be left fully open. Gases of Groups II and III flowing through valve 42 hit the outside of the cold panel 26 where the air is caused to freeze out. The cold panel 26 differs from prior art cryopump cold panels in that the charcoal 66 is on the inside of the cold panel 26 and is completely contained except for the metered orifice 64. In the unit that was built and tested, a fixed orifice 0.5 mm in diameter was used.

The cryopump of FIG. 3 is significantly better than the diffusion pump and cold trap of FIG. 1 in a conventional leak detector system. A diffusion pump 16 (FIG. 1) has a fixed ratio of pumping speed for helium relative to air, typically, helium speed is slightly greater than that of air. The cryopump 22 of FIG. 3 can have an air pumping speed that is 2 to 100 times greater than helium. This means that when helium enters the system through a leak in the test vessel, the partial pressure of helium at the mass spectrometer will be 2 to 100 times greater than if the system is pumped with a diffusion pump, assuming the same size piping is used and that the air speed of the two pumps is similar. Thus, the cryopump leak detector is more sensitive to helium leaks.

If the size of the inlet port 64 to the cold panel absorbent 66 is made variable, then the sensitivity of the system can be adjusted during leak testing. Thus, after a leak has been found it is desirable to evacuate the helium from the vessel as quickly as possible so that the leak testing can continue to find other leaks. Thus if the valve 64 is opened the pumping speed of helium is increased and the system can be purged quickly to ready the instrument for the next test. Valve 42 is referred to as the accumulator valve. By partially closing valve 42 it is possible to decrease the pumping speed of helium and thus increase its partial pressure when helium enters the system. Closing valve 42 also reduces the pumping speed of all gases; thus, it can be used when testing a vessel that is very tight and can be maintained below $1 \times 10^{-5}$ Torr with reduced pumping speed. This technique can not be used when leak detecting with a sniffing probe.

The cryopump shown in FIG. 3 was tested to determine how much helium can be adsorbed by the charcoal before the pump has to be regenerated. The test unit used a quadrupole mass spectrometer residual gas analyzer installed in parallel with the mass spectrometer which measures the partial pressure of helium as well as other gas species present. In this application there is very little heat load on a cryopump, thus, the second stage of the refrigerator operates at temperatures in the range of 9° to 12° K. where charcoal has an appreciable capacity for helium. Using helium as a tracer gas, it was found that the partial pressure of helium stayed below $1 \times 10^{-10}$ Torr with 0.1 standard ml of helium adsorbed. This amount of helium is equivalent to a constant influx at a partial pressure of $1 \times 10^{-5}$ Torr for a period of over one week.

Sometimes when looking for a very small leak, valve 42 is closed entirely and helium and air are allowed to accumulate in the vessel. The cryopump can be used in another manner that enhances this technique as follows:
1. Start with a freshly regenerated cryopump.
2. Allow it to pump on a vessel which has helium maintained over the region where a leak is suspected.
3. After pumping for a period of several hours, use a heater on the second stage of the refrigerator 50 to warm it to a temperature of 17°–20° K. and watch the mass spectrometer for an indication of helium.

This technique takes advantage of the fact that helium is readily desorbed as the charcoal is warmed to 20° K. However, at 20° K. the other gases frozen on the cold panel have equilibrium pressures below $1 \times 10^{-10}$ Torr.

The system was tested and compared with identical tests conducted using a Veeco Model MS-9AB leak detector. All tests were run in a lab with properly maintained equipment. Table I summarizes the test results and lists results for the cryopump apparatus of FIG. 3 for comparison. The Veeco unit has a rated sensitivity of $2 \times 10^{-10}$ standard $cm^3$/sec. However, the sensitivity has degraded appreciably with use. Pumping speeds which are determined largely by conductive losses in the piping are comparable in both units for nitrogen. The Veeco unit has a pumping speed for helium that is about twice that for nitrogen which is characteristic of a diffusion pump system. The lower helium speed in the cryopump system contributes to its improved sensitivity.

TABLE I

COMPARISON OF DIFFUSION PUMPED LEAK DETECTOR AND EXPERIMENTAL CRYOPUMPED UNIT

|  | Cryo Pump | Diffusion Pump |
|---|---|---|
| Sensitivity - std cc/sec | $7 \times 10^{-12}$ | $2.3 \times 10^{-9}$ |
| Response time - sec. | <1 | 1 |
| Recovery time - sec. | 18 | >600 |
| Pumping speed at Inlet Port - L/S | | |
| He | 0.9 | 2.8 |
| $N_2$ | 1.6 | 1.5 |

A surprising result was that the recovery time for the diffusion pump system responding to a burst of helium was extremely long. Apparently helium is adsorbed in the oil in the pump as well as the oil on the walls of the tubing and is pumped out of the system over a long period of time.

Figure 4:
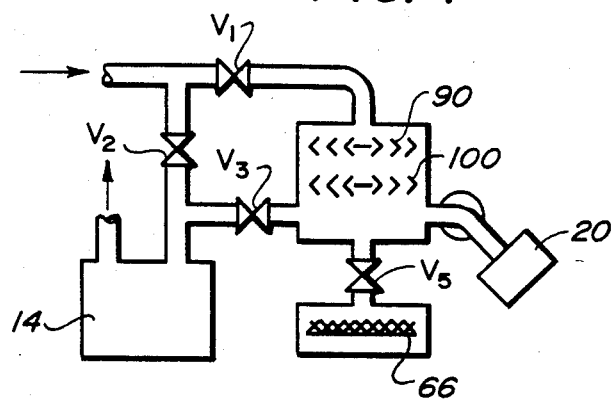
FIG. 4 is a schematic representation of the method and apparatus according to an alternate embodiment of the present invention.
Figure 5:
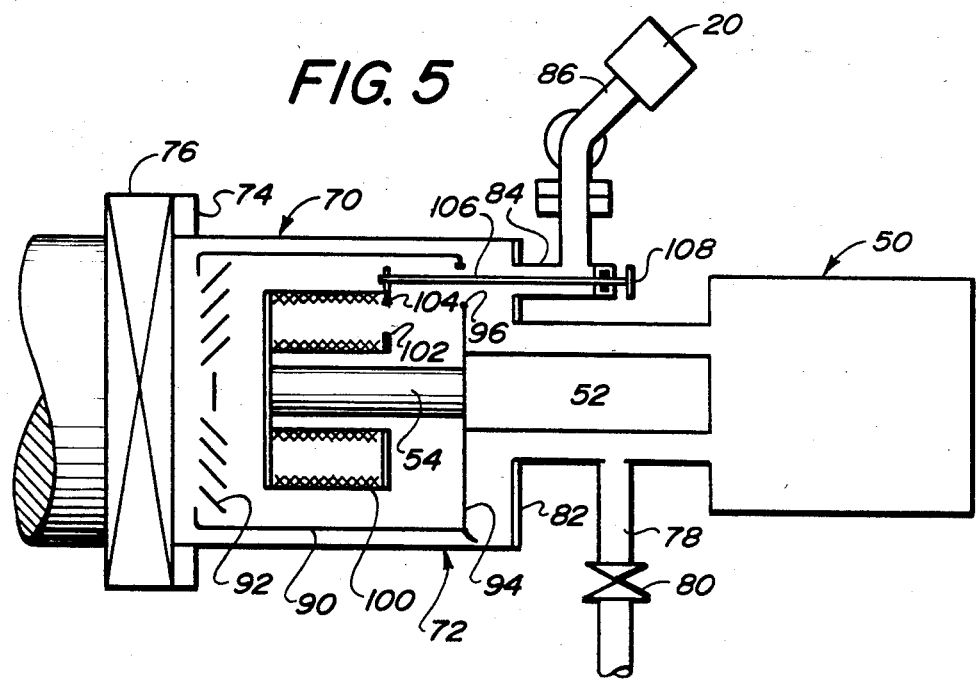
FIG. 5 is a schematic representation of an alternate cryopump according to the present invention.

Another possible cryopump configuration is shown schematically in FIG. 4 and in cross-section in FIG. 5. Referring to FIG. 5, the cryopump 70 includes a housing 72 which has a first end 74 which is adapted for mounting to a large inlet valve 76 and to the test vessel or probe (not shown). Housing 72 includes an inlet port 78 and valve 80 so that the mechanical pump can be connected to the system. The second end 82 of housing 72 includes an outlet port 84 which in turn is connected by a conduit 86 to the mass spectrometer 20. Housing 72 includes means for mounting refrigerator 50 thereto in fluid type relationship. Disposed within housing 72 is a first or warm panel 90 which is in the form of a cylinder closed on its first end by a conventional louver 92 and on its second end by a cover 94 save for a port 96, the function of which will be explained hereinafter. Cold panel 100 is the same as cold panel 26 of FIG. 3 except that the inlet orifice 102 is fitted with a variable valve or aperture 104 which is controlled from outside the housing 72 by means of a rod 106 and adjusting knob 108 which is sealed by conventional means to prevent gases escaping therethrough.

With the apparatus of FIG. 4 and 5, the system permits a much larger inlet valve 76 to be used without having the accumulator valve 42 in the system. Thus, the speed for pumping air will be much greater, pumpdown time will be shorter, and the time to recover after finding a leak will be faster.

The advantages of a leak detector system which incorporates a cryopump in accord with the invention are as follows:
1. Faster pump-down due to being able to open the inlet valve 34, 76 at high pressure.

2. The mass spectrometer of the system to be leak detected can not be contaminated with diffusion pump oil.
3. The need to refill the liquid nitrogen cold trap of the prior art system is eliminated.
4. Improved sensitivity because of the high ratio of air to helium pumping speed.
5. The ability to vary the sensitivity and pump helium at high speed if the valve or orifice to the cryoadsorption material is made variable.
6. The ability to accumulate helium and selectively desorb it.
7. The ability of the device to operate in any orientation.

Cryopumps according to the present invention must be designed in a way that changes in gas pressure either inside or outside of the enclosures do not cause explosion or implosion of the device. In addition to a pressure relief valve on the main housing (not shown), the warm panel 24 of FIG. 3 has an "O" ring seal on neck which will unseat if the external pressure on the warm panel 24 causes it to deflect. Furthermore, valve 42 of FIG. 3 and valves 64 and 96 of FIGS. 3 and 5 respectively are designed so that they are never fully closed so that gas pressures can equalize as the cryopump warms up.

It has been demonstrated that a cryopump according to the present invention in combination with a leak detector system can achieve sensitivity of $7 \times 10^{-12}$ std. cm$^3$/sec. With sufficient capacity for helium, devices according to the present invention can be used for periods of two weeks or longer between regeneration.

Having thus described my invention what is desired to be secured by Letters Patent of the United States is set forth in the appended claims.

I claim:

1. In a mass spectrometer leak detector system including means to remove certain gases from the testing atmosphere so that the system can detect the presence of a tracer gas, the improvement comprising:
    said means includes a cryopump having a first surface or warm panel to freeze out water vapor and carbon dioxide, a second surface or cold panel to freeze out nitrogen, oxygen, argon, carbon monoxide, methane and halogenated hydrocarbons, and a third surface or cold adsorbent covered panel to adsorb helium, hydrogen and neon.
2. A mass spectrometer leak detector system according to claim 1 wherein said cryopump has a pumping speed for air at least two times greater than for helium.
3. A mass spectrometer leak detector system according to claim 1 wherein access to the third surface is controlled to control or vary the pumping speed of helium while maintaining a constant pumping speed for gases frozen out in the first and second surfaces in order to permit adjustment of the sensitivity of the system.
4. A mass spectrometer leak detector system according to claim 1 wherein access to said second surface and said third surface can be varied while maintaining a constant pumping speed for gases frozen out on the first surface in order to permit adjustment of the sensitivity of the system.
5. In a method for testing for leaks using a tracer gas which is detected by a mass spectrometer incorporated into the leak detector system said method effected by utilizing a cryopump capable of removing water vapor, carbon dioxide, nitrogen, oxygen, argon, carbon monoxide, methane, halogenated hydrocarbons, helium, hydrogen and neon from an atmosphere under vacuum conditions by freeze out or adsorption to maintain a vacuum sufficient for proper operation of the mass spectrometer.
6. A method according to claim 5 including the step of selecting a cryopump so that it will pump air at least twice as fast as helium.
7. A method according to claim 5 including the step of varying the pumping speed for helium while maintaining a constant pumping speed for all other gases.
8. A method according to claim 5 including the steps of varying the pumping speed of all gases except water vapor and carbon dioxide which are pumped at a constant speed.
9. A method according to claim 5 including the steps of accumulative and selective desorption of helium in order to enhance the sensitivity for helium when used as a tracer gas.
10. A cryopump comprising in combination:
    a housing having an inlet port adapted to receive a control valve and an outlet port adapted for mounting to an instrument;
    a first or warm panel disposed within said housing, said warm panel adapted to enclose a second or cold panel, said first panel further including at least one access port adapted for receiving a control valve;
    a second or cold panel disposed within said warm panel, said cold panel having a first surface exposed to the warm panel and an enclosed second surface having disposed thereon as adsorbent material, said enclosed second surface accessible to any atmosphere contained within said first panel by means of a port; and
    a source of cryogenic refrigeration so adapted to cool said first panel to a temperature of between 40° and 80° K. and said second panel and said adsorbent to a temperature of between 10° and 15° K.
11. A cryopump according to claim 10 wherein said port in said second panel is fitted with an aperture of fixed dimension so that said adsorbent will pump helium at a rate at least two times less than the rate the cryopump will pump air.
12. A cryopump according to claim 10 wherein said port in said second panel is fitted with a variable aperture.
13. A cryopump according to claim 10 wherein said housing inlet and said first panel outlet are positioned so that atmosphere entering said cryopump flows around the outside of said warm panel.
14. A cryopump according to claim 13 wherein the access port to the interior of said first panel contains a control valve.
15. A cryopump according to claim 13 wherein there is included an outlet to direct atmosphere toward an instrument after flowing around said warm panel.
16. A cryopump for interposition between a source of an atmosphere containing gases and an instrument to detect the presence of one of the gases which may be a component of the atmosphere comprising, in combination:
    a housing adapted to receive a first end adapted form fixing to a source of the atmosphere and a second end adapted to be fixed to the instrument.
    a first or warm panel of elongated hollow configuration disposed within said housing, said warm panel adapted to contact the atmosphere as it moves from said first end toward said second end of said housing;

a second or cold panel disposed within said first panel, said cold panel having a first surface exposed to the warm panel and an enclosed second surface having disposed thereon an adsorbent material, said enclosed second surface accessible to the atmosphere inside said cryopump by means of a port; and a source of cryogenic refrigeration so adapted to cool said first panel to a temperature of between 40° and 80° K. and said second panel and said adsorbent to a temperature of between 10° and 15° K.

17. A cryopump according to claim 16 wherein an inlet loover is disposed on the end of said warm panel adjacent the first end of said housing.

18. A cryopump according to claim 16 wherein the port in said second panel is fitted with an aperture of fixed dimensions so that said adsorbent will pump helium at a rate at least two times less than the rate the cryopump will pump air.

19. A cryopump according to claim 16 wherein said port in said second panel is fitted with a variable aperture.

20. A cryopump according to claim 16 wherein said port in said second end of said housing is adapted for mounting to a mass spectrometer leak detector.

* * * * *